United States Patent [19]

Mitariten

[11] Patent Number: 5,106,396
[45] Date of Patent: Apr. 21, 1992

[54] ADSORPTION PROCESSES WITH INTERMEDIATE PRODUCT RECOVERY USING TWO ADSORPTION ZONES

[76] Inventor: Michael J. Mitariten, UOP - Old Saw Mill River Rd., Rte. 100C, Tarrytown, N.Y. 10591

[21] Appl. No.: 620,999

[22] Filed: Dec. 3, 1990

Related U.S. Application Data

[63] Continuation-in-part of Ser. No. 458,039, Dec. 28, 1989, Pat. No. 5,042,995.

[51] Int. Cl.$^5$ ............................................. B01D 53/04
[52] U.S. Cl. ............................................. 55/26; 55/28; 55/33; 55/62; 55/68; 55/74; 55/75
[58] Field of Search .............................. 55/25-28, 55/62, 68, 74, 75, 33, 73

[56] References Cited

U.S. PATENT DOCUMENTS

| | | | |
|---|---|---|---|
| Re. 31,014 | 8/1982 | Sircar | 55/26 |
| 3,430,418 | 3/1969 | Wagner | 55/25 |
| 3,738,084 | 6/1973 | Simonet et al. | 55/31 |
| 3,841,058 | 10/1974 | Templeman | 55/33 |
| 3,986,849 | 10/1976 | Fuderer et al. | 55/26 |
| 4,171,207 | 10/1979 | Sircar | 55/26 |
| 4,249,915 | 2/1981 | Sircar et al. | 55/26 |
| 4,472,178 | 9/1984 | Kumar et al. | 55/25 |
| 4,484,933 | 11/1984 | Cohen | 55/25 |
| 4,512,780 | 4/1985 | Fuderer | 55/26 |
| 4,726,816 | 2/1988 | Fuderer | 55/26 |
| 4,732,578 | 3/1988 | Benkmann | 55/26 X |
| 4,732,596 | 3/1988 | Nicholas et al. | 55/25 X |
| 4,770,676 | 9/1988 | Sircar et al. | 55/26 |
| 4,784,672 | 11/1988 | Sircar | 55/28 X |
| 4,790,858 | 12/1988 | Sircar | 55/26 |
| 4,813,980 | 3/1989 | Sircar | 55/26 |
| 4,846,851 | 7/1989 | Guro et al. | 55/26 |
| 4,892,565 | 1/1990 | Schmidt et al. | 55/26 |
| 4,913,709 | 4/1990 | Kumar | 55/26 |
| 4,914,218 | 4/1990 | Kumar et al. | 55/26 |
| 4,915,711 | 4/1990 | Kumar | 55/26 |
| 4,963,339 | 10/1990 | Krishnamurthy et al. | 55/26 X |

FOREIGN PATENT DOCUMENTS

| | | | |
|---|---|---|---|
| 0317235 | 5/1989 | European Pat. Off. | |
| 0367618 | 5/1990 | European Pat. Off. | 55/25 |
| 1536995 | 12/1978 | United Kingdom. | |

*Primary Examiner*—Robert Spitzer

[57] ABSTRACT

Adsorption processes are provided for the separation of a feedstream containing less readily, intermediately, and more readily adsorbable components using first and second adsorption zones. The second adsorption zone utilizes a cycle that includes a cocurrent displacement step and the intermediately adsorbable components are recovered therefrom by countercurrent depressurization. The first adsorption zone is purged with a stream from the second adsorption zone to recover the more readily adsorbable components. The processes are particularly suitable for recovering carbon monoxide from feedstreams containing hydrogen, carbon monoxide and other compounds such as methanol and higher alcohols, methane, dimethyl ether, dimethyl ketone, water, carbon dioxide, oxygen and mixtures thereof. The processes are particularly applicable to methanol reforming processes wherein hydrogen and carbon monoxide product streams are recovered from a methanol reactor effluent stream also containing components selected from methanol, methane, dimethyl ether, carbon dioxide, oxygen and water.

28 Claims, No Drawings

ADSORPTION PROCESSES WITH INTERMEDIATE PRODUCT RECOVERY USING TWO ADSORPTION ZONES

CROSS-REFERENCE TO RELATED APPLICATIONS

This application is a continuation-in-part of copending U.S. Ser. No. 458,039, filed Dec. 28, 1989, now U.S. Pat. No. 5,042,995, hereby incorporated by reference.

FIELD OF THE INVENTION

This invention pertains to the field of separating and purifying at least one gas component of a feedstream by adsorption processes. More particularly, the present invention relates to integrated adsorption processes wherein first and second adsorption zones are arranged in series to separate a feedstream containing a less readily adsorbable component, an intermediately adsorbable component and a more readily adsorbable component wherein the intermediately adsorbable component is a desired product.

BACKGROUND OF THE INVENTION

Adsorption processes are well known for separating and purifying less readily adsorbable components from feedstreams containing mixtures thereof with more readily adsorbable components.

Pressure swing adsorption processes generally involve passage of the feedstream through two or more adsorber beds containing molecular sieves or other adsorbents which selectively adsorb the more readily adsorbable components of the feedstream. The adsorbers are arranged to operate in sequence with suitable lines, valves, timers and the like so there is established an adsorption period during which the more readily adsorbable components of the feedstream are adsorbed on the molecular sieve or other adsorbent and a regeneration period during which the more readily adsorbable components are desorbed and purged from the adsorbent to regenerate it for reuse.

Such selective adsorption commonly occurs in the adsorber beds at an upper adsorption pressure, with the more readily adsorbable component thereafter being desorbed by pressure reduction to a lower desorption pressure. Such PSA processing is disclosed in U.S. Pat. No. 3,430,418 to Wagner and in U.S. Pat. No. 3,986,849 to Fuderer et al, wherein cycles based on the use of multi-bed systems are described in detail. As is generally known and described in these patents, the contents of which are incorporated herein by reference as if set out in full, the PSA process is generally carried out in a sequential processing cycle that includes each bed of the PSA system. In addition to the adsorption step, such cycles commonly include steps involving the release of void space gas from the product end of each bed in one or more cocurrent depressurization steps upon completion of the adsorption step. In these cycles, the released gas typically is employed for pressure equalization and for subsequent purge steps. The bed is thereafter countercurrently depressurized and often purged to desorb the more selectively adsorbed component of the feedstream from the adsorbent and to remove such gas from the feed end of the bed prior to the repressurization thereof to the adsorption pressure.

PSA processes were first used for gas separation in which only one of the key components was recovered at high purity. For example, from 100 moles of feedstream containing 80 moles hydrogen and 20 moles carbon monoxide, the process of Wagner, U.S. Pat. No. 3,430,418, could separate 60 moles of hydrogen at 99.999% purity, but no pure carbon monoxide could be recovered; 20 moles of carbon monoxide and 20 moles of hydrogen remained mixed at 50% purity each. A complete separation could not be made. Only the less readily adsorbable, light component was recovered at high purity.

For the recovery of a pure, more readily adsorbable component, an additional step was necessary, namely, rinsing of the bed with a heavy component to displace the light component from the bed prior to depressurization. This rinsing step is described in several earlier patents. The problems with these processes are the following: (a) if the rinsing is complete and the light component is completely displaced from the bed, pure heavy component can be obtained, but the adsorption front of the heavy component breaks through to the light component and the latter cannot be recovered at high purity; (b) if the displacement of the light component is incomplete and if such bed is depressurized countercurrently to recover the heavy key component at the feed end, the light component still present in the bed reaches the feed end very rapidly and the purity of the heavy component drops. It is, therefore, not practical with such processes to obtain both key components at high purity in a single PSA unit.

Such complete separations can be obtained, however, by two separate pressure swing adsorption processing units wherein each unit includes several fixed beds. From a feedstream containing, for example, hydrogen and carbon monoxide (CO), the first unit recovers pure hydrogen and a carbon monoxide-rich gas containing 70% carbon monoxide. This feedstream is compressed and passed through a second PSA unit which recovers pure carbon monoxide and a hydrogen-rich gas. The hydrogen-rich gas can be added as feedstream to the first PSA unit and then the cycle is repeated. The combination of the two independent PSA units can make an excellent separation at very high flexibility. For example, from a feedstream with two components this system can recover more than 99.8% of the less readily adsorbable component, such as hydrogen, at a purity of 99.999% and also recover essentially 100% of the more readily adsorbable component, such as carbon monoxide, at a purity higher than 99.5%.

A PSA process suitable for the recovery of both the less and more readily adsorbable components is described in British Patent 1,536,995 to Benkmann. The process is based on two beds in series cycle as shown in FIG. 2 of Benkmann. The feedstream is introduced to the lower bed which retains the more readily adsorbable component. The feed step is followed by a cocurrent depressurization step wherein the less readily adsorbable component is recovered from the upper bed and a copurge step in which the less readily adsorbable or light component is further displaced in the lower bed by a recycled stream of heavy components, so that the lower bed at the end of the step contains only the heavy component. At this moment, the connection between the upper and lower beds is interrupted by an automatic valve and the heavy product is recovered from the lower bed by (countercurrent) depressurization. The upper bed is in the meantime, also depressurized and purged to remove all of the heavy component. The step sequence of the upper and lower bed are interlocked and cannot be run with independent cycles. When additional intermediately adsorbable components are present in the feedstream, the Benkmann patent discloses continued copurging to displace the intermediately adsorbable components and pass them through both the lower and upper beds in a chromatographic fashion. Such a flow scheme allows the intermediately adsorbable components to be adsorbed in the effluent end of the upper adsorber. Since the presence of more readily adsorbable components in the effluent end of an adsorber bed can result in a purity reduction of the less readily adsorbable component, such flow schemes are generally avoided by those skilled in the art. Moreover, the step sequence of the upper and lower beds are interlocked and cannot be run with independent cycles. The flexibility of this system is, therefore, reduced. For example, since the upper and lower beds are interlocked in series, if process conditions such as feedstream composition change, it is at least inconvenient if not impossible to change the volume or time ratio of the two beds.

U.S. Pat. No. 4,171,207, to Sircar, discloses a process wherein multicomponent feedstreams containing hydrogen as a primary component, a secondary key component that is more readily adsorbed by the adsorbent than hydrogen and one or more dilute components more readily adsorbed than both hydrogen and the secondary key component, are subjected to adsorption in a PSA system for the separate recovery of high purity hydrogen and of the secondary component. The process employs a plurality of trains of adsorber beds wherein each train of adsorbent beds undergoes a cycle having the following sequence of steps: (a) adsorption at a superatmospheric pressure between two beds in series, (b) high pressure rinsing, i.e., copurging, of the second bed, (c) depressurization of the second bed to substantially ambient pressure and recycling a portion thereof as said high pressure rinse, (d) evacuation of the second bed to subatmospheric pressure, (e) pressure equalization of the first bed, (f) depressurization of the first bed to substantially ambient pressure, (g) purging of the first bed with a portion of the product from step (c) and repressurization of both beds.

The process of above-identified U.S. Pat. No. 4,171,207 discloses that a portion of the secondary component depressurization product is used for purging the first bed and that the remaining portion is used for the high pressure rinsing. In order to recover the secondary component from the second adsorber, the patent discloses an evacuation step, i.e., step (d). Such evacuation steps are often commercially undesirable due to the large diameter piping, compressors and costs associated therewith as well as perceived notions of unreliability with vacuum systems.

U.S. Pat. No. 4,512,780, to Fuderer, discloses a PSA process that utilizes at least four adsorber beds for the separation of a feedstream containing less readily adsorbable component, an intermediately adsorbable component and a more readily adsorbable component, by employing a cocurrent displacement step in which the less readily adsorbable component is essentially completely removed from the adsorption bed. The bed is then cocurrently depressurized with the intermediately adsorbable component being discharged from the product end thereof as a product of desired purity. The displacement gas is obtained by diverting a portion of the gas released from that or another bed in the system during the cocurrent depressurization or the countercurrent depressurization steps. The process of the above-described patent avoids the problems associated with interlocked upper and lower adsorber beds in order to provide improved operating flexibility. Moreover, it does not require a vacuum step, yet it provides a high purity intermediately adsorbable product at high recoveries. However, since the intermediately adsorbable product is obtained from the product end of the adsorber, and hence adsorbed therein, a reduction in the purity of the less readily adsorbable component can occur.

U.S. Pat. No. 4,813,980, to Sircar, discloses a process directed to the recovery of ammonia synthesis gas, i.e., $H_2$ and $N_2$ as the less readily adsorbable component, and $CO_2$, i.e., more readily adsorbable component, from an oxidized hydrocarbon reformate. The process of the above-identified U.S. patent utilizes two groups of adsorber beds connected in series. The adsorbers in the first group undergo a cycle sequence comprising the following steps, (a) adsorption, (b) high pressure rinse, i.e., copurge, (c) depressure, (d) evacuation, i.e., vacuum, (e) equalize pressure, and (f) final pressurization. The adsorbers in the second group undergo a cycle sequence comprising the following steps (1) adsorption, (2) pressure equalization, (3) depressurizing, (4) purge, and (5) repressurization. The process uses vacuum steps and does not provide for the recovery of high purity intermediately adsorbable components.

Another process that utilizes similar PSA cycle sequences as disclosed in the above-identified U.S. Pat. No. 4,813,980, but provides for the recovery of a primary key component, a secondary key component that is more readily adsorbed than the primary key component, and minor dilute tertiary components that are less readily adsorbed than the secondary key component, is disclosed in U.S. Pat. No. 4,790,858, to Sircar. This patent, however, discloses the use of vacuum steps and three sets of adsorption columns to achieve the desired separation.

U.S. Pat. No. 4,846,851, to Guro, et al., relates to a process for purifying ammonia synthesis gas and discloses a PSA process having two adsorber sections in series. The patent does not specifically dislcose the use of vacuum desorption, but rather discloses high pressure rinsing, i.e., copurging, of the first adsorber section with recycle of the effluent stream to the first adsorber section feed. As such, the process can provide a purified product from the first adsorber section, however, additional adsorbent inventory can be required to accommodate the recycle. Moreover, the process does not provide a purified intermediately adsorbable product. Additionally, the purge gas used for the low pressure rinsing of the first adsorber section of the process disclosed in above-identified U.S. Pat. No. 4,846,851 is provided from the desorption or purge products from the second adsorber section. In fact, it is stated at col. 5, lines 17 to 19 that, "An important feature of the present invention is in the use of gases desorbed from the B bed in the regeneration of the A bed." Such use of desorbed, i.e., adsorbable gases is often undesirable because the adsorbable gases can be adsorbed in the effluent end of the adsorber, thus leading to contamination of the adsorption effluent stream. Moreover, the adsorbable components present in the purge can occupy adsorption sites in the adsorbent thereby reducing the adsorptive capacity of the first adsorber section.

European Patent Application No. 88310723.7, Publication No. EP 0 317 235 A2, published May 24, 1989, discloses a reforming process to produce hydrogen, carbon monoxide, carbon dioxide and water and a PSA separation process that can be used to recover carbon monoxide from mixtures with hydrogen and carbon dioxide, i.e., the carbon monoxide is the intermediately adsorbable component. The reference discloses the use of two arrays of adsorber vessels in series operated such that the hydrogen is obtained from the effluent end of the second vessel, the carbon dioxide is obtained from the feed end of the first vessel and the carbon monoxide is obtained from both the effluent end of the first vessel and the feed end of the second vessel.

Generally, thermal swing processes utilize the process steps of adsorption at a low temperature, regeneration at an elevated temperature with a hot purge gas and subsequent cooling down to the adsorption temperature. One process for drying gases generally exemplary of thermal swing processes is described in U.S. Pat. No. 4,484,933, issued to Cohen. The patent describes basic thermal swing processing steps coupled with the use of an auxiliary adsorber bed for improving the regeneration step. Thermal swing processes are often used for drying gases and liquids and for purification where trace impurities are to be removed. Often, thermal swing processes are employed when the components to be adsorbed are strongly adsorbed on the adsorbent, i.e., water, and thus, heat is required for regeneration.

Combined thermal swing—pressure swing processes have been proposed for dehydration and carbon dioxide removal, particularly in the purification of air and natural gas streams. U.S. Pat. No. 3,738,084, issued to Simonet, et al., discloses a process for the adsorption of moisture and carbon dioxide that employs thermal swing adsorption in one adsorber and both pressure swing and thermal swing in another adsorber. U.S. Pat. No. 3,841,058, issued to Templeman, discloses a method of purifying natural gas or the like to render it suitable for liquefaction. The method consists essentially of absorbing water and methanol from a natural gas stream also containing carbon dioxide in a first bed of absorbent material and subsequently absorbing carbon dioxide in a second bed of absorbent material, regenerating the absorbent material of the first bed by passing gas therethrough at an elevated temperature and regenerating the absorbent material in the second bed by pressure reduction at a temperature not exceeding 100° C. U.S. Pat. No. 4,249,915, issued to Sircar, et al., discloses a process employing both thermal swing and pressure swing adsorption to remove moisture and carbon dioxide from air. The patent discloses that the air stream is passed to the pressure swing adsorber to remove moisture and the effluent therefrom is passed to the thermal swing adsorber to remove carbon dioxide.

U.S. Ser. No. 463,315, filed Jan. 10, 1990 now U.S. Pat. No. 5,012,037 discloses processes for the separation of light hydrocarbons from a feedstream containing hydrogen, light hydrocarbons and heavy hydrocarbons. The disclosed processes employ a thermal swing adsorption zone to adsorb heavy hydrocarbons and a pressure swing adsorption zone to remove the remaining light hydrocarbons. At least a portion of the product from the pressure swing adsorption zone is used to purge the thermal swing adsorption zone.

Hence it can be seen in view of the forgoing that separating a feedstream by adsorption processes to provide a high purity less readily adsorbable component, e.g., hydrogen, and an intermediately adsorbable component, e.g. carbon monoxide, when more readily adsorbable components are present has proved to be difficult. Accordingly, improved adsorption processes are sought which can provide a high purity intermediately adsorbable component without requiring vacuum desorption and without using adsorbable gases for low pressure purging.

SUMMARY OF THE INVENTION

The present invention provides an improved adsorption process for the separation of intermediately adsorbable components from mixtures with more and less readily adsorbable components which utilizes first and second adsorption zones arranged in series and can provide high purities and recoveries of both the less readily adsorbable and the intermediately adsorbable components.

In broad aspect, the process includes the steps of: (a) passing the feedstream to the first adsorption zone at a first zone adsorption pressure and temperature in which the at least one more readily adsorbable component is adsorbed, and recovering a first zone adsorption effluent stream depleted in the at least one more readily adsorbable components relative to the feedstream; (b) passing the first zone adsorption effluent stream to the second adsorption zone at a second adsorption pressure in which the intermediately adsorbable component is adsorbed, and recovering a second zone adsorption effluent stream depleted in the intermediately readily adsorbable component relative to the feedstream; (c) cocurrently displacing the less readily adsorbable component contained within said second adsorption zone with a displacement gas having a concentration of the intermediately adsorbable component which is higher than that of the feedstream and recovering a displacement effluent stream comprising the less readily adsorbable component; (d) heating the first adsorption zone to a first zone desorption temperature that is higher than the first zone adsorption temperature by passing a heated purge gas comprising at least a portion of an effluent stream from the second adsorption zone comprising the less readily adsorbable component through the first adsorption zone and recovering a first zone purge effluent stream comprising the at least one more readily adsorbable component; and (e) countercurrently depressurizing the second adsorption zone to a second zone desorption pressure that is at or above atmospheric pressure and recovering a second zone desorption effluent stream enriched in the intermediately adsorbable component relative to the feedstream.

In a specific aspect of the invention, the less readily adsorbable component is hydrogen, the intermediately adsorbable component is carbon monoxide and the more readily adsorbable components comprise compounds selected from methanol, methane, dimethyl ether, dimethyl ketone, oxygen, carbon dioxide and water. In this aspect of the invention, the process includes the steps of (a) passing the feedstream to the first adsorption zone at a first zone adsorption pressure and temperature in which the at least one other component is adsorbed and recovering a first zone adsorption effluent stream comprising hydrogen and carbon monoxide; (b) passing the first zone adsorption effluent stream to the second adsorption zone at a second adsorption zone pressure in which carbon monoxide is adsorbed, and recovering a second zone adsorption effluent stream comprising hydrogen; (c) cocurrently displacing hydrogen contained within the second adsorption zone with a displacement gas having a concentration of carbon monoxide which is higher than that of the feedstream, and recovering a displacement effluent stream comprising hydrogen; (d) cocurrently depressurizing the second adsorption zone to a second zone equalization pressure to provide an equalization gas; (e) further cocurrently depressurizing the second adsorption zone to a second zone blow-down pressure to provide a provide-purge gas comprising hydrogen; (f) countercurrently depressurizing the second adsorption zone to a second zone desorption pressure that is at or above atmospheric pressure and recovering a second zone desorption effluent stream comprising carbon monoxide; (g) countercurrently purging the second adsorption zone with a first purge gas comprising hydrogen and recovering a second zone purge effluent stream comprising carbon monoxide; (h) partially repressurizing the second adsorption zone by introducing the equalization gas therein until the pressure is approximately equal to the second zone equalization pressure; (i) further repressurizing the second adsorption zone to the second zone adsorption pressure; (j) heating the first adsorption zone to a first zone desorption temperature that is higher than the first zone adsorption temperature by passing a second purge gas comprising at least a portion of an effluent stream from the second adsorption zone comprising hydrogen through the first adsorption zone at an elevated temperature and recovering a first zone purge effluent stream comprising the at least one other component; and (k) cooling the first adsorption zone to the first zone adsorption temperature.

DETAILED DESCRIPTION OF THE INVENTION

The PSA process of the invention relates to conventional PSA processing in which each bed of an adsorption zone undergoes, on a cyclic basis, high pressure adsorption, optional cocurrent depressurization to intermediate pressure level(s) with release of void space gas from the product end of the bed, countercurrent depressurization to lower desorption pressure with the release of desorbed gas from the feed end of the bed, with or without purge of the bed, and repressurization to higher adsorption pressure. The process of the present invention adds to this basic cycle sequence, the use of first and second adsorption zones arranged in series in combination with a cocurrent displacement step in the second adsorption zone in which the less readily adsorbable component is essentially completely removed therefrom. The second adsorption zone is then countercurrently depressurized to a desorption pressure that is at or above atmospheric pressure with the intermediately adsorbable component being discharged from the feed end thereof as a product of desired purity. In the multibed adsorption systems to which the invention is directed, the displacement gas used for each bed is advantageously obtained by diverting a portion of the gas released from that or another bed in the system during the cocurrent depressurization or the countercurrent depressurization steps, although other suitable displacement gas may also be employed if available with respect to the overall processing operation in which PSA with intermediate product recovery is being employed.

Those skilled in the art will appreciate that the high pressure adsorption step of the PSA process comprises introducing the feedstream to the feed end of the adsorbent bed at a high adsorption pressure. The less readily adsorbable component passes through the bed and is discharged from the product end thereof. An adsorption front or fronts are established in the bed with said fronts likewise moving through the bed from the feed end toward the product end thereof. When the feedstream contains a less readily adsorbable component, an intermediately adsorbable component and a more readily adsorbable component, a leading adsorption front of said intermediately adsorbable component will be established and move through the bed in the direction of the product or discharge end thereof ahead of a trailing adsorption front of the more readily adsorbable component.

The thermal swing process of the present invention relates to conventional thermal swing processing in which each bed of an adsorption zone undergoes, on a cyclic basis, adsorption at an adsorption temperature wherein the more readily adsorbable component(s) in the feedstream are selectively adsorbed to provide an adsorption effluent stream enriched in the less readily adsorbable components, regeneration at a desorption temperature that is higher than the adsorption temperature which is conducted by passing a purge gas at an elevated temperature, i.e., equal to or higher than the desired desorption temperature through the bed, and cooling the bed to the adsorption temperature by passing a purge gas therethrough. Such process steps are disclosed, for example in above-cited U.S. Pat. No. 4,484,933 hereby incorporated by reference.

In the present invention, two adsorption zones are utilized. In the first adsorption zone, the more readily adsorbable components are adsorbed at an adsorption pressure temperature and the less and intermediately adsorbable components are passed through the first adsorption zone and into the second adsorption zone. The first zone adsorption pressure is preferably from about 100 to 500 psig. The first zone adsorption temperature is any temperature effective to adsorb the more readily adsorbable components in the feedstream, and preferably from about 0° to 400° F. It is to be understood that the adsorption zones of the present invention contain adsorber beds containing adsorbent suitable for adsorbing the particular components to be adsorbed therein. An advantage of the present invention is that the first adsorption zone can comprise as few as two adsorber beds. As the capacity of the first adsorber bed for the more readily adsorbable component is reached, that is, preferably before a substantial portion of the leading adsorption front has passed through the first adsorber bed, the feedstream is directed to another bed in the first adsorption zone. The loaded bed is then desorbed by heating the bed to a desorption temperature effective to desorb the more readily adsorbable components by passing a purge gas therethrough, preferably in a countercurrent direction. Preferably, the first zone desorption temperature is from about 100° to 700° F. It is to be also understood that the term "countercurrent" denotes that the direction of gas flow through the adsorption zone, i.e., adsorber bed, is countercurrent with respect to the direction of feedstream flow. Similarly, the term "cocurrent" denotes flow in the same direction as the feedstream flow. The purge gas is at least partially comprised of an effluent stream, e.g., the adsorption effluent stream or the cocurrent displacement effluent stream, from the second adsorption zone, as hereinafter described, which comprises the less readily adsorbable component. When hydrogen is the less readily adsorbable component, the purge gas is preferably rich in hydrogen, i.e., greater than 50 mole % hydrogen. In order to heat the adsorber bed, the purge gas is heated to an elevated temperature equal to or higher than the desired desorption temperature. In a particular aspect of the present invention, the purge gas further comprises at least a portion of the effluent stream from a cocurrent depressurization step that is included in the cycle of the second adsorption zone as hereinafter described. After the desorption step the first adsorption zone is cooled, preferably by purging with an effluent stream from the second adsorption zone.

Of course, it is to be understood that even though thermal swing steps are employed in the adsorption cycle in the first adsorption zone, additional process steps, including PSA steps such as countercurrent and cocurrent depressurization steps or cocurrent displacement steps, can be employed. When countercurrent depressurization is employed, the first zone desorption pressure is preferably from about 0 to about 50 psig. Accordingly, the first adsorption zone can comprise more than two adsorber beds. The desorption and purge effluent streams from the first adsorption zone can be recovered from the process as a product, partially recycled to the feedstream, or utilized in another process which may be integrated with the process of the present invention.

The adsorption effluent stream from the first adsorption zone, which is enriched in the less readily and intermediately adsorbable components relative to the feedstream, is passed to the second adsorption zone at an adsorption pressure wherein the intermediately adsorbable component is adsorbed and the less readily adsorbable component is recovered as a second zone adsorption effluent stream. The second zone adsorption pressure is preferably about the same as the first zone adsorption pressure. The term "enriched" is intended to be with reference to the feedstream composition unless otherwise noted. The second adsorption zone comprises at least three adsorber beds. As the capacity of the first adsorber bed in the second zone for the intermediately adsorbable component reaches a predetermined point, the feedstream, i.e., first zone adsorption effluent stream, is directed to another adsorber bed. Then a displacement gas is passed through the bed in a direction cocurrent to the feeding step. By the use of a cocurrent displacement gas essentially free of the less readily adsorbable component, thus having a molar concentration of intermediately adsorbable and/or more readily adsorbable components, the less readily adsorbable component that remains in the void spaces of the adsorbent bed ahead of the leading adsorption front can be essentially completely displaced from the bed. This enables the intermediately adsorbable component to be thereafter discharged from the feed end of the bed as a product of desired purity by countercurrently depressurizing the bed. The cocurrent displacement step can be performed in conjunction with one or more cocurrent depressurization steps. When a cocurrent depressurization step is used, it can be performed either before, simultaneously with, or subsequent to the displacement step. The final pressure achieved during cocurrent depressurization steps is intermediate between the adsorption and desorption pressures and is preferably within the range of from about 30 to 250 psig. The effluent stream from the cocurrent depressurization step, which is comprised primarily of less readily adsorbable components, can be used to partially repressurize another adsorber bed. It can also be utilized, at least in part, to purge the first adsorption zone as hereinbefore described.

After the termination of the cocurrent displacement step and any desired cocurrent depressurization step(s), the adsorber bed is desorbed by reducing the pressure in a direction countercurrent to the feeding direction to a desorption pressure that is preferably from about 0 to 50 psig and the intermediate product is recovered at the desired purity. Preferably, a portion of the desorption effluent stream recovered from the second adsorption zone is utilized as feed for the cocurrent displacement step.

As hereinbefore set forth, the process of the present invention can be performed with as few as two adsorber beds in the first adsorption zone and three adsorber beds in the second adsorption zone. The first and second adsorption zones can essentially operate independently of each other so long as there is a continuous feeding path from a bed in the first adsorption zone to a bed in the second adsorption zone and as long as there is a purge gas source from the second adsorption zone, i.e., adsorption effluent stream, cocurrent displacement effluent stream or cocurrent depressurization effluent stream, that can be used to purge the adsorber beds in the first adsorption zone. As such, the cycle times of the respective first and second adsorption zones can be easily adjusted to compensate for changes in feed composition.

A configuration wherein the adsorption effluent stream from the second adsorption zone is used to purge the first adsorption zone for both heating and cooling is set forth in Table 1 below.

TABLE 1

| Zone No. | Bed No. | Cycle | | | | | |
|---|---|---|---|---|---|---|---|
| 2 | 1 | A | | C | D | | R |
| | 2 | D | R | A | | C | D |
| | 3 | C | | D | R | | A |
| 1 | 1 | | A | | HT | | CL |
| | 2 | | HT | CL | | A | |

A configuration wherein the cocurrent displacement effluent stream from the second adsorptive zone is used to purge the first adsorption zone for both heating and cooling is set forth in Table 2, below.

TABLE 2

| Zone No. | Bed No. | Cycle | | | | | | | |
|---|---|---|---|---|---|---|---|---|---|
| 2 | 1 | A | | C | E | PP | BD | P | E | R |
| | 2 | E | R | A | | C | E | PP | BD | P |
| | 3 | BD | P | E | R | A | | C | E | PP |
| | 4 | E | PP | BD | P | E | R | A | | C |
| | 5 | C | E | PP | BD | P | E | R | A | |
| 1 | 1 | | A | | HT | CL | | | | |
| | 2 | HT | CL | | A | | | | | |

In the above tables, A represents an adsorption step at adsorption pressure and temperature, with the feedstream being introduced to the feed end of a bed in the first adsorption zone and the less readily and intermediately adsorbable components being discharged from the product end thereof and into the feed end of a bed in the second adsorption zone and the less readily adsorbable component being discharged from the product end thereof.

C represents cocurrent displacement by the introduction of gas essentially free of the less readily adsorbable component to the feed end of the bed so as to essentially completely displace said less readily adsorbable component from the bed; E represents a cocurrent depressurization-pressure equalization step between a bed that has completed its cocurrent displacement step and a bed that has been purged at lower desorption pressure; PP represents a cocurrent depressurization step with discharge of less readily adsorbable component from the product end thereof thereafter used for product, purge gas, or repressurization gas; BD represents a countercurrent depressurization step wherein the zone two desorption product comprise the intermediately adsorbable component at the desired purity; HT and CL represent the heating step for desorbing the first zone and thereafter cooling to the adsorption temperature, respectively, wherein the purge gas is supplied from the second adsorption zone as hereinbefore indicated. P represents a purging step at low pressure in the second adsorption zone; R represents a repressurization step wherein a process gas is utilized to repressurize the adsorber bed to the adsorption pressure. It will be understood that in addition to the three- and six-bed configuration illustrated above for the second adsorption zone, other configurations, i.e., 4, 5, 7 or more beds, can be employed and are intended to be within the scope of the present invention. Likewise, more than two adsorber beds can be utilized in the first adsorption zone.

It will further be understood that various changes and modifications can be made in the details of the PSA process with intermediate product recovery as herein described and illustrated above without departing from the scope of the invention as set forth in the appended claims. Thus, in addition to varying the number of beds employed, the number of cocurrent depressurization-pressure equalization steps employed, whether or not such pressure equalizations are direct or indirect through an external storage vessel, whether the displacement gas employed is available from an external source or, for example, is supplied by diverting a portion of the countercurrent depressurization gas, may all be varied depending upon the circumstances and results desired in any given application. Likewise, the multicomponent gas separation desired, the intermediately adsorbable component to be recovered and the desired purity level thereof, the use of countercurrent depressurization, with or without purge, or the use of a purge step, with or without countercurrent purge, the use of an external vessel for providing purge gas or the alternate use, also in accordance with conventional practice, of cocurrent depressurization-direct provide purge to another bed, may be subject to wide variation within the scope of the invention. Accordingly, the individual steps described, as well as conventional variations thereof are generally known by those skilled in the art and need not be further described herein. It will be further understood that PSA systems necessarily incorporate various conduits, valves, and other control features to accomplish the necessary switching of adsorbent beds from one step to the next, in appropriate sequence as, in conventional PSA operations.

It will also be understood that the invention can be carried out using any suitable adsorbent material in the first and second adsorption zones having a selectivity for various components of a feedstream over other such components, thereby providing a less readily adsorbable component, an intermediately adsorbable component and a more readily adsorbable component. Suitable adsorbents known in the art and commercially available include crystalline molecular sieves, activated carbons, activated clays, silica gels, activated aluminas and the like. The molecular sieves include, for example, the various forms of silicoaluminophosphates, and aluminophosphates disclosed in U.S. Pat. Nos. 4,440,871; 4,310,440 and 4,567,027, hereby incorporated by reference as well as zeolitic molecular sieves.

Zeolitic molecular sieves in the calcined form may be represented by the general formula;

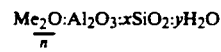

$$\frac{Me_2O:Al_2O_3:xSiO_2:yH_2O}{n}$$

where Me is a cation, x has a value from about 2 to infinity, n is the cation valence and y has a value of from about 2 to 10.

Typical well-known zeolites which may be used include, chabazite, also referred to as Zeolite D, clinoptilolite, erionite, faujasite, also referred to as Zeolite X and Zeolite Y, ferrierite, mordenite, Zeolite A, and Zeolite P. Other zeolites suitable for use according to the present invention are those having a high silica content, i.e., those having silica to alumina ratios greater than 10 and typically greater than 100. One such high silica zeolite is silicalite, as the term used herein includes both the silicapolymorph disclosed in U.S. Pat. No. 4,061,724 and also the F-silicalite disclosed in U.S. Pat. No. 4,073,865, hereby incorporated by reference. Detailed descriptions of some of the above identified zeolites may be found in D. W. Breck, *ZEOLITE MOLECULAR SIEVES*, John Wiley and Sons, New York, 1974, hereby incorporated by reference.

It is often desirable when using crystalline molecular sieves that the molecular sieve be agglomerated with a binder in order to ensure that the adsorbent will have suitable physical properties. Although there are a variety of synthetic and naturally occurring binder materials available such as metal oxides, clays, silicas, aluminas, silica-aluminas, silica-zirconias, silica-thorias, silica-berylias, silica-titanias, silica-alumina-thorias, silica-alumina-zirconias, mixtures of these and the like, clay-type binders are preferred. Examples of clays which may be employed to agglomerate the molecular sieve without substantially altering the adsorptive properties of the zeolite are attapulgite, kaolin, volclay, sepiolite, palygorskite, kaolinite, bentonite, montmorillonite, illite and chlorite. The choice of a suitable binder and methods employed to agglomerate the molecular sieves are generally known to those skilled in the art and need not be further described herein.

It is within the scope of the invention to separate any feedstream containing a less readily adsorbed component, an intermediately adsorbable component and a more readily adsorbable component, with said component being understood to comprise one gas or more than one gas having relatively similar adsorption characteristics with respect to the adsorbent employed and the separation and intermediate product recovery desired.

One feedstream suitable for separation according to the process of the present invention is a product gas from a methanol reformer comprising hydrogen as the less readily adsorbable component, carbon monoxide as the intermediately adsorbable component, and at least one of methane, methanol, carbon dioxide, dimethyl ether, dimethyl ketone, oxygen and water as more readily adsorbable components. Minor amounts of other more readily adsorbable components such as higher alcohols and other hydrocarbons in the $C_2$–$C_5$ carbon range may also be present as the more readily adsorbable components. The process of the present invention can be conveniently used to recover hydrogen and carbon monoxide as products from the reformer and provide a recycle stream comprising the more readily adsorbable components. The reforming of methanol, also known as methanol cracking, is generally known in the art and need not be described in detail herein. U.S. Pat. Nos. 4,316,880 and 4,692,322 relate to methanol reforming and are hereby incorporated by reference herein. Generally, however, in methanol reforming a methanol-containing feedstream is vaporized and heated to a temperature of from about 300° to 600° C. and pressurized to a pressure of from about 140 to 700 psig and passed to a methanol conversion zone containing one or more methanol reactors. Suitable methanol conversion catalysts include those containing zinc oxide and chromium oxides or atomic zinc, copper and vanadium. The reaction is endothermic and as such, tubular reactors which can be heated by a liquid bath are well suited. It is preferred to partially condense the reactor effluent stream at about ambient temperature before passing it to the adsorption zones of the present invention. The resulting condensate will typically contain unreacted methanol and water. The vapor portion of the reactor effluent stream is then passed to the adsorption zones as hereinbefore described.

Another suitable feedstream is one rich in hydrogen but also containing methane and $C_2+$ hydrocarbons. With reference to such a feedstream, hydrogen will be the least readily adsorbed, methane will adsorb more readily than hydrogen, and the $C_2+$ hydrocarbons will be the most readily or readily adsorbed of all the components. In this particular separation, it is readily feasible to recover methane as the intermediately adsorbable component at a desired purity level. For such purpose, the feedstream is introduced to the feed end of an adsorption bed in the first adsorption zone at the adsorption pressure and temperature with the less readily adsorbable and intermediately adsorbable components, i.e., hydrogen and methane being removed from the product end of the bed and passed directly to the feed end of an adsorber bed in the second adsorption zone with the less readily adsorbable component, i.e., hydrogen being removed therefrom. A displacement gas essentially free of hydrogen and having a molar concentration of said methane greater than in the feedstream is introduced to the feed end of the bed so as to displace residual amounts of hydrogen component from the void spaces of the bed and from the bed itself. The bed is also cocurrently depressurized so as to release additional void space gas from the product end of the bed. This may be carried out either before said cocurrent displacement step, during or after said step. Those skilled in the art will appreciate that the cocurrent depressurization step and said cocurrent displacement step will be carried out so as to essentially completely displace hydrogen from the bed, with said essentially complete displacement being consistent with the intermediate product purity specification established for any particular application.

The bed in the second adsorption zone is then countercurrently depressurized to recover the intermediately adsorbable component, i.e., methane from the feed end of the bed as product having the desired purity. The adsorber bed in the first adsorption zone that has the more readily adsorbable component, i.e., $C_2+$ hydrocarbons, adsorbed thereon, is regenerated by heating and optionally countercurrently depressurized as hereinbefore described. Both the adsorber beds in the first and second adsorption zones are then restored to adsorption conditions, e.g., by cooling the first adsorption zone and repressurizing the second adsorption zone.

Still another suitable feedstream may be derived from an ammonia plant purge gas from which the ammonia has been removed. Such a feedstream typically comprises hydrogen as the less readily adsorbed component, argon as the intermediately adsorbed component, and nitrogen and methane as more readily adsorbed components. Similarly, a crude ammonia synthesis gas feedstream obtained from the steam reforming of methane, i.e., natural gas, would be a suitable feed and would comprise hydrogen as the less strongly adsorbed component, methane as the intermediately readily adsorbed component and carbon dioxide and water as the most readily adsorbed components.

The following example is provided to illustrate the present invention and is not intended to limit the scope of the claims that follow.

EXAMPLE

An off gas from a methanol cracking unit containing about 66 mol. % hydrogen, 32 mol. % carbon monoxide and 2% other components including carbon dioxide, methanol and water is passed to a first adsorption zone containing three adsorber beds each of which is loaded with a sufficient quantity of activated carbon adsorbent to adsorb the other components fraction. It should be noted that other adsorbents such as silica gel or molecular sieves may be employed in addition to or instead of the activated carbon adsorbent. The choice of a particular adsorbent can be determined by one skilled in the art and is not a critical aspect of the present invention. The amount of adsorbent required to achieve the separation likewise can be determined by those skilled in the art and need not be described in detail herein. In the first adsorption zone, the adsorber bed in which the adsorption is occurring is maintained at a pressure of about 210 psig and a temperature of about 80° F. During the adsorption step, hydrogen and carbon monoxide pass through the bed and are recovered as a first zone adsorption effluent stream at a pressure just slightly below that of the feedstream, e.g., 205 psig. Following the adsorption step, the adsorber bed in the first adsorption zone that has just completed adsorption, is desorbed by depressurizing, in a countercurrent direction, to a pressure level of about 50 psig to provide a first zone desorption effluent stream that is enriched in the other components described above, i.e., carbon dioxide, methanol and water. Following the desorption step, the bed in the first adsorption zone that has completed depressurization is heated by purging in a countercurrent direction, at about 50 psig with an effluent stream from the second adsorption zone as hereinafter described that has been heated to a temperature of about 300° F. Following the heating step, the bed is cooled by continued purging with an effluent stream from the second adsorption zone that has not been heated and thereafter is repressurized with a portion of one or both of the displacement effluent stream or the adsorption effluent stream from the second adsorption zone as hereinafter described. Since the pressure of the repressurization supply gas is lower than the desired pressure in the first adsorption zone, i.e., 210 psig, the bed is repressurized to the extent possible with the displacement effluent stream or the adsorption effluent stream from the second adsorption zone and then finally repressurized to the desired adsorption pressure of 210 psig with feedstream. Cooling the adsorber bed to the adsorption temperature can also be performed in conjunction with the repressurization and with the subsequent adsorption step if desired. After the repressurization and cooling steps are completed, the adsorption cycle is repeated starting with the adsorption step.

The adsorption effluent stream from the first adsorption zone, which is substantially freed of the other components, i.e., contains less than about 5 mol % of impurity, and contains primarily hydrogen and carbon monoxide, is passed to a second adsorption zone containing five adsorber beds each of which contain a suitable quantity of 5A zeolitic molecular sieve adsorbent or optionally other adsorbents as hereinbefore noted to adsorb the carbon monoxide from the gas stream. In the second adsorption zone, the pressure in the adsorber bed undergoing adsorption is maintained approximately equal to the pressure in the first adsorption zone less any pressure drop through the adsorber bed valves connecting conduit and the like, e.g., 200 psig. The adsorption effluent stream from the adsorber bed undergoing adsorption contains primarily hydrogen and has a purity of at least 99 mol. % and a portion of this stream is used to cool an adsorber bed in the first adsorption zone to the adsorption temperature as hereinbefore described. Following the adsorption step, the adsorber bed that has completed adsorption is purged with a displacement gas, the source of which is hereinafter defined, at essentially the adsorption pressure to further remove hydrogen contained in the void space of the adsorber bed. The displacement gas has a carbon monoxide concentration at least equivalent to or higher than the carbon monoxide concentration in the feedstream, i.e., 32 mol. %. The displacement effluent stream obtained during the displacement step contains primarily hydrogen and also has a purity of at least 99 mol. % and a portion of this stream is used to cool an adsorber bed in the first adsorption zone to the adsorption temperature. Following the displacement step, the bed in the second adsorption zone that has completed displacement is cocurrently depressurized. The effluent stream obtained during the cocurrent depressurization is used to partially repressurize another adsorber bed in the second adsorption zone undergoing repressurization. The step is continued until the pressure in the two beds has essentially equalized, in this case at 120 psig. Following the cocurrent depressurization step, the adsorber bed in the second adsorption zone that has completed cocurrent depressurization is further cocurrently depressurized to a pressure of about 50 psig. The effluent stream gas obtained during this second cocurrent depressurization is heated to a temperature of about 300° F. and used as purge gas in the first adsorption zone as hereinbefore described. Following the second cocurrent depressurization step, the bed in the second adsorption zone that has completed cocurrent depressurization is then countercurrently depressurized to a pressure level of about 5 psig to desorb the bed. The desorption effluent stream obtained during this step contains primarily carbon monoxide and has a purity of at least 98 mol. %. Following the countercurrent depressurization step, the adsorber bed in the second adsorption zone that has completed countercurrent depressurization is countercurrently purged with hydrogen product gas, i.e., a portion of the second zone adsorption effluent stream to further remove carbon monoxide from the adsorber bed. The effluent stream obtained contains primarily carbon monoxide and has a purity of at least 98 mol. %. Following the countercurrent purge step, the bed in the second adsorption zone that has completed countercurrent purge, is partially repressurized in a countercurrent direction to a pressure of about 120 psig by pressure equalization with the first cocurrent depressurization effluent stream as hereinbefore described. Following the partial repressurization/equalization step, the bed in the second adsorption zone that has completed partial repressurization is further repressurized using product hydrogen. The adsorber bed is then further repressurized to the extent necessary with feedstream, i.e., adsorption effluent stream from the first adsorption zone, and the adsorption cycle is repeated beginning with the adsorption step.

What is claimed is:

1. An adsorption process for the separation of a feedstream containing a less readily adsorbable component, an intermediately adsorbable component and at least one more readily adsorbable component, with recovery of the intermediately adsorbable component as a desired product, in an integrated adsorption system having first and second adsorption zones arranged in series, said process comprising the following process steps:

a) passing the feedstream to the first adsorption zone at a first zone adsorption pressure and temperature in which the at least one more readily adsorbable component is adsorbed, and recovering a first zone adsorption effluent stream depleted in the at least one more readily adsorbable component relative to the feedstream;

b) passing the first zone adsorption effluent stream to the second adsorption zone maintained at a second zone adsorption pressure in which the intermediately adsorbable component is adsorbed, and recovering a second zone adsorption effluent stream comprising the less readily adsorbable component and depleted in the intermediately adsorbable component relative to the feedstream;

c) cocurrently displacing the less readily adsorbable component contained within said second adsorption zone with a displacement gas having a concentration of the intermediately adsorbable component which is higher than that of the feedstream and recovering a displacement effluent stream comprising the less readily adsorbable component;

d) heating the first adsorption zone to a first zone desorption temperature that is higher than the first zone adsorption temperature by passing a heated purge gas comprising at least a portion of the displacement effluent stream from the second adsorption zone comprising the less readily adsorbable component through the first adsorption zone and recovering a first zone purge effluent stream comprising the at least one more readily adsorbable component; and e) countercurrently depressurizing the second adsorption zone to a second zone desorption pressure that is at or above atmospheric pressure and recovering a second zone desorption effluent stream enriched in the intermediately adsorbable component relative to the feedstream.

2. The process of claim 1 further comprising the step of cocurrently depressurizing the second adsorption zone to a second zone cocurrent depressurization pressure either before, simultaneously with, or after cocurrently displacing the less readily adsorbable component contained within the second adsorption zone, and recovering a second zone cocurrent depressurization effluent stream comprising the less readily adsorbable component.

3. The process of claim 2 wherein the heated purge gas comprises at least a portion of the second zone cocurrent depressurization effluent stream.

4. The process of claim 1 wherein the heated purge gas comprises at least a portion of the second zone adsorption effluent stream, the displacement effluent stream or mixtures thereof.

5. The process of claim 1 wherein the temperature of the heated purge gas is from about 100° to 700° F.

6. The process of claim 1 further comprising the step of countercurrently depressurizing the first adsorption zone to a first zone desorption pressure that is at or above atmospheric pressure and recovering a first zone desorption effluent stream comprising the at least one more readily adsorbable component.

7. The process of claim 1 further comprising the step of cocurrently depressurizing the second adsorption zone to provide an equalization gas for repressurizing an adsorber bed in the second adsorption zone.

8. The process of claim 1 wherein the first adsorption zone comprises at least two adsorber beds.

9. The process of claim 1 wherein the second adsorption zone comprises at least three adsorber beds.

10. The process of claim 1 wherein the less readily adsorbable component is hydrogen.

11. The process of claim 10 wherein the intermediately adsorbable component is carbon monoxide.

12. The process of claim 11 wherein the at least one more readily adsorbable component comprises compounds selected from the group consisting of methanol, methane, dimethyl ether, dimethyl ketone, water, carbon dioxide, oxygen and mixtures thereof.

13. An adsorption process for the separation of a feedstream containing hydrogen, carbon monoxide and at least one other component selected from the group consisting of methanol, methane, dimethyl ether, dimethyl ketone, carbon dioxide, oxygen, water and mixtures thereof, in an integrated adsorption system having first and second adsorption zones arranged in series, said process comprising the following process steps:

a) passing the feedstream to the first adsorption zone at a first zone adsorption pressure and temperature in which the at least one other component is adsorbed and recovering a first zone adsorption effluent stream comprising hydrogen and carbon monoxide;

b) passing the first zone adsorption effluent stream to the second adsorption zone at a second adsorption zone pressure in which carbon monoxide is adsorbed, and recovering a second zone adsorption effluent stream comprising hydrogen;

c) cocurrently displacing hydrogen contained within the second adsorption zone with a displacement gas having a concentration of carbon monoxide which is higher than that of the feedstream, and recovering a displacement effluent stream comprising hydrogen;

d) cocurrently depressurizing the second adsorption zone to a second zone equalization pressure to provide an equalization gas;

e) further cocurrently depressurizing the second adsorption zone to a second zone blow-down pressure to provide a provide-purge gas comprising hydrogen;

f) countercurrently depressurizing the second adsorption zone to a second zone desorption pressure that is at or above atmospheric pressure and recovering a second zone desorption effluent stream comprising carbon monoxide;

g) countercurrently purging the second adsorption zone with a first purge gas comprising hydrogen and recovering a second zone purge effluent stream comprising carbon monoxide;

h) partially repressurizing the second adsorption zone by introducing the equalization gas therein until the pressure is approximately equal to the second zone equalization pressure;

i) further repressurizing the second adsorption zone to the second zone adsorption pressure;

j) heating the first adsorption zone to a first zone desorption temperature that is higher than the first zone adsorption temperature by passing a second purge gas comprising at least a portion of the displacement effluent stream from the second adsorption zone comprising hydrogen through the first adsorption zone at an elevated temperature and recovering a first zone purge effluent stream comprising the at least one other component; and k) cooling the first adsorption zone to the first zone adsorption temperature.

14. The process of claim 13 wherein the first zone adsorption pressure is from about 100–500 psig.

15. The process of claim 14 wherein the second zone adsorption pressure is from about 100–500 psig and is approximately equal to the first zone adsorption pressure.

16. The process of claim 14 wherein the first zone adsorption temperature is from about 0° to 400° F.

17. The process of claim 14 wherein the first zone desorption temperature is from about 100° to 700° F.

18. The process of claim 14 further comprising the step of countercurrently depressurizing the first adsorption zone to a first zone desorption pressure that is at or above atmospheric pressure and recovering a first zone desorption effluent stream comprising at least one more readily adsorbable component.

19. The process of claim 18 wherein the first zone desorption pressure is from about 0–50 psig.

20. The process of claim 13 wherein the displacement gas comprises at least one of the second zone desorption effluent stream or the second zone purge effluent stream.

21. The process of claim 20 wherein the displacement gas is compressed to approximately the second zone adsorption pressure prior to displacing hydrogen from the second adsorption zone.

22. The process of claim 21 wherein the second zone equalization pressure is from about 75–250 psig.

23. The process of claim 22 wherein the second zone blow-down pressure is from about 30-100 psig.

24. The process of claim 23 wherein the second zone desorption pressure is from about 0-50 psig.

25. The process of claim 13 wherein the feedstream comprises from about 50-80 mol. % hydrogen, from about 10-40 mol. % carbon monoxide and from about 1-10 mol. % of the at least one other component.

26. The process of claim 13 wherein the second zone adsorption effluent stream and the second zone displacement effluent stream combined have a product purity of at least 85 mol. % hydrogen.

27. The process of claim 26 wherein the second zone desorption effluent stream and second zone purge effluent stream combined have a product purity of 95 mol. % carbon monoxide.

28. The process of claim 13 wherein the first adsorption zone contains at least three adsorber beds and the second adsorption zone contains at least five adsorber beds.

* * * * *